United States Patent [19]

Tachikawa et al.

[11] 4,262,311
[45] Apr. 14, 1981

[54] DEVICE FOR AUTOMATICALLY RETURNING SUB-SCANNING CARRIAGE OF FACSIMILE APPARATUS

[75] Inventors: Harunori Tachikawa; Sadayoshi Kimura, both of Tokyo, Japan

[73] Assignee: Nippon Electric Co., Ltd., Tokyo, Japan

[21] Appl. No.: 27,069

[22] Filed: Apr. 4, 1979

[30] Foreign Application Priority Data

Apr. 11, 1978 [JP] Japan .............................. 53-47914[U]

[51] Int. Cl.³ .............................................. H04N 1/14
[52] U.S. Cl. ................................. 358/289; 346/139 A
[58] Field of Search ....................... 358/285, 289, 293; 346/139 A, 139 B

[56] References Cited

U.S. PATENT DOCUMENTS

| 1,907,881 | 5/1933 | Rudolph | 358/293 |
| 2,601,236 | 6/1952 | Asten | 358/289 |
| 2,656,240 | 10/1953 | Hell | 346/139 A |
| 2,881,247 | 4/1959 | Levine et al. | 358/293 |

OTHER PUBLICATIONS

Japanese Utility Model Public Disclosure No. 51-657-32–Published May 24, 1976.
Japanese Patent Publication 47-372, 3 pages.

*Primary Examiner*—Robert L. Griffin
*Assistant Examiner*—Joseph A. Orsino, Jr
*Attorney, Agent, or Firm*—Laff, Whitesel & Rockman

[57] ABSTRACT

According to the present invention, there is provided an automatic carriage-returning device for a facsimile apparatus comprising a rotary drum for performing the main scanning, a carriage for performing the sub-scanning along the axis of the drum, a belt for moving the carriage in the sub-scanning direction, a coupling means for connecting the belt with the carriage, and spring means operative to return the carriage toward the initial position, said carriage being returned to the initial position by means of repeating actuation and release of the coupling means to the belt.

8 Claims, 4 Drawing Figures

DEVICE FOR AUTOMATICALLY RETURNING SUB-SCANNING CARRIAGE OF FACSIMILE APPARATUS

BACKGROUND OF THE INVENTION

This invention relates to a facsimile apparatus and, more particularly, to a mechanism for automatically returning the sub-scanning carriage of a facsimile appratus.

In a facsimile apparatus, of a rotary drum scanning type, comprises a scanning drum which is rotatable about its axis for sub-scanning and an optical sensing device or recording stylus disposed opposite the drum surface to move in a direction normal to the main scanning. It is necessary that the sub-scanning carriage comprising the optical sensing device or recording stylus (hereunder referred to simply as a "carriage") be returned to the initial position after it has completed a sub-scanning in forward direction. While such returning is effected manually in most prior art systems, several systems have been proposed to simplify the returning operation by providing the carriage with a mechanism for giving an automatic carriage return. Japanese Patent Publication No. 372/72 and Japanese Utility Model Public Disclosure No. 65732/76 describe a method of buffering the return impact by the application of a braking force onto a disc through which eddy currents flow, and method of temporarily stopping the carriage just before it reaches the initial position, respectively. However, these and other conventional methods of automatically returning the carriage have a disadvantage because they require a complex control mechanism.

SUMMARY OF THE INVENTION

It is therefore a primary object of this invention to provide a mechanism of returning the carriage of a facsimile apparatus, free from the disadvantage of the conventionel technique and effectively achieving the intended returning operation by means of a simple control and with a small impact resulting from the carriage impinging on the initial position.

Other objects, features and advantages of this invention will be apparent by reading the following detailed description of the invention in conjunction with the accompanying drawings.

According to the present invention, an automatic carriage returning device for a facsimile apparatus comprises a rotary drum for performing the main scanning, a carriage for performing the sub-scanning along the axis of the drum, a belt for moving the carriage in the sub-scanning direction, a coupling means for connecting the belt with the carriage, and spring means operative to return the carriage toward the initial position.

The carriage is returned to the initial position by means of a repeated actuation and release of the coupling means to the belt.

Since a simple mechanism is used to repeatedly couple the carriage with and disconnect it from the belt, only a very small impact will result when the carriage returns to the initial position.

DETAILED DESCRIPTION OF THE PREFERRED EMBODIMENT

Figure 1:
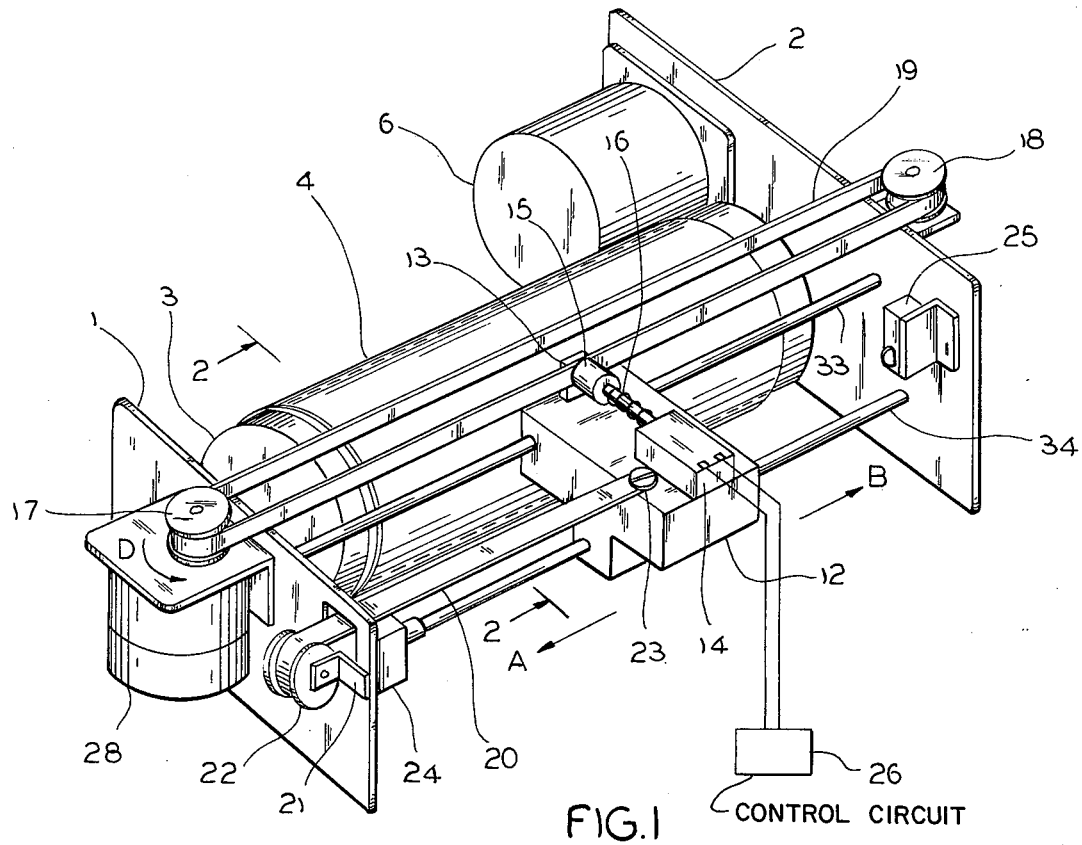
FIG. 1 is a perspective view illustrating one embodiment of the receiver of the facsimile apparatus according to this invention.
Figure 2:
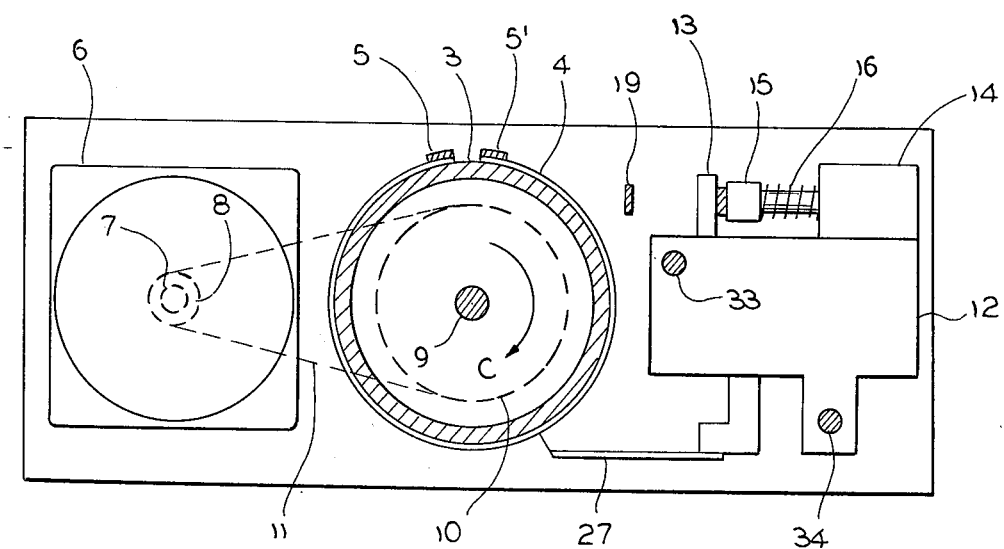
FIG. 2 is a cross section of the receiver taken along line 2—2 of FIG. 1, which includes a motor, drum and a carriage.

In FIGS. 1 and 2, paper-holding bars 5 and 5' hold a recording paper against the surface of a drum 3, which is rotatably supported by support frames 1 and 2. A timing belt 11 is supported under tension between the drum 3 and a pulley 8 mounted on the shaft 7 of a drum drive motor 6, to rotate the drum in a direction C for main scanning. Under the bottom side of the carriage 12 is disposed a recording stylus 27 which is brought into contact with the surface of the recording paper 4 in a receive mode of the facsimile.

The sub-scanning mechanism incorporating the automatic carriage returning device comprises the carriage 12 which is guided by guide shafts 33 and 34 each supported by the frames 1 and 2, so as to be moved both in a foward B direction and in a return A direction. A boss 13, integrally mounted on the carriage 12, is coupled with a plunger 15 of a solenoid 14 biased by a compressive spring 16, to captivate an endless belt 19 between the boss 13 and the plunger 15. Belt 19 is supported under tension by a drive pulley 17 and an idler pulley 18. To supply a predetermined tension, a spiral spring 20 made of stainless steel is supported on one end by a bracket 21 (attached to the frame 1) by means of a shaft 22, whereas the other end of the spring is connected to the carriage 12 by a screw 23. A microswitch 24 is disposed in such a position that it acts as a stopper for the carriage 12. A microswitch 25 is a sub-scanning end indicating switch which is operated when actuated by the carriage 12 moving in the forward B direction.

Figure 3:
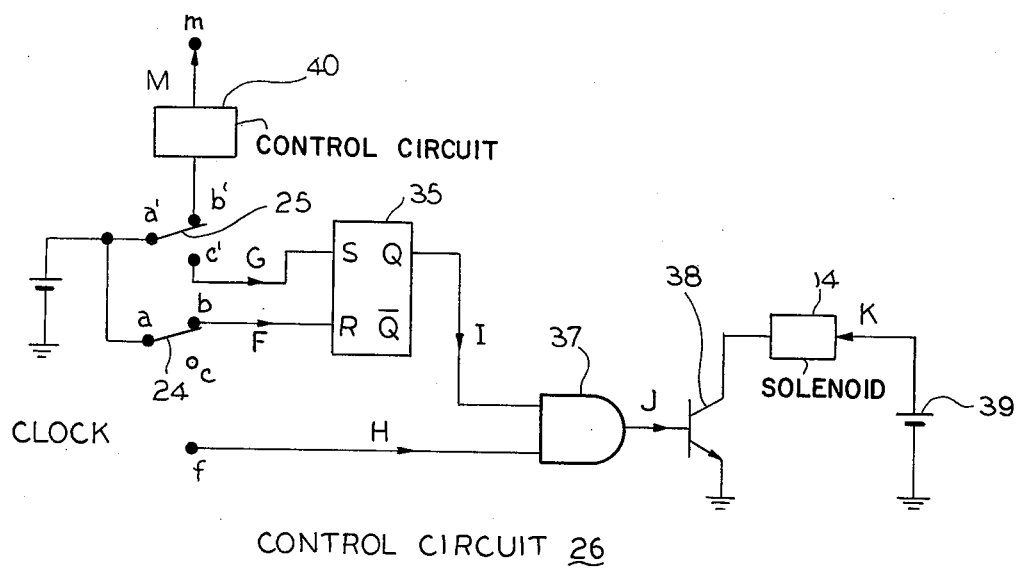
FIG. 3 is a block diagram of the control circuit used to control the automatic carriage returning mechanism of this invention.

FIG. 3 shows a control circuit 26 for controlling the solenoid 14, the circuit microswitches 24 and 25, comprising an S-R flip-flop 35, an AND gate 37, and a transistor 38. The terminals a and a' of the microswitches 24 and 25, respectively, are connected to a common power source. The respective contacts b and c' of the microswitches 24 and 25 are connected to terminals R and S of the flip-flop 35, respectively. The output of the flip-flop 35 and a clock pulse are supplied to different inputs of the AND gate 37. The output of the AND gate is connected to the base of the transistor 38. The transistor 38 responds to the base voltage, to supply the solenoid 14 with a current from a solenoid power source 39. When the microswitch 25 is actuated by the carriage 12, contacts a' and c' are closed temporarily, and when the microswitch 24 is actuated by the carriage 12, movable contact a and contact c close. For other conditions, the microswitch 25 is actuated to interconnect contact a' and contact b', to provide a voltage across a control circuit 40 which switches on or off a sub-scanning drive motor 28 (FIG. 1).

Figure 4:
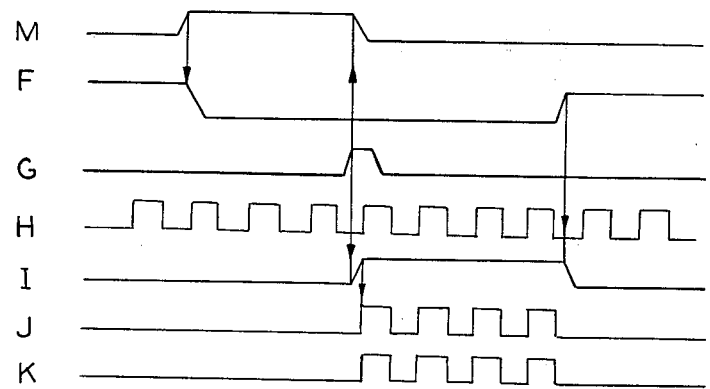
FIG. 4 is a timing diagram illustrating the operation of the control circuit shown in FIG. 3.

The operation of the control circuit shown in FIG. 3 will now be explained, by reference to the timing diagram of FIG. 4. When a starter switch (not shown) is turned on, the sub-scanning drive motor 28 is driven responsive to a signal M (FIG. 4) to rotate the drive pulley 17 in a direction indicated by the arrow D (FIG. 1). The microswitch 24 is opened to apply a low level input signal F (FIG. 4) to the terminal R of the flip-flop 35. The carriage 12, located at the initial position, is engaged with the endless belt 19 which is held between the boss 13 and plunger 15 under such a pressure that it overcomes the tension of the spring 20 thereby enabling the carriage to be moved in the direction B. The carriages 12 makes a further advance until the spring of microswitch 25 is temporarily placed in the position c' (FIG. 3). The supply of the input signal M to the sub-scanning motor 28 is stopped when the contacts a', b' open, while at the same time, a temporarily high level of input signal G is delivered through closed contacts a', c' to the S terminal of the flip-flop 35 which then provides a high level output signal I.

The logical product of the flip-flop output signal I and a clock pulse H having a pulse repetition rate of 200 ms causes the AND gates 37 to provide a pulsed output signal J of a waveform having the pulse repetition rate of the clock pulse. The transistor 38 responsively operates to supply the solenoid 14 with a pulse current which operated the plunger 15 (FIG. 1). Since the tension of the spring 20 continuously pulls the carriage 12 in the direction A, it is returned in the direction A only during the period while the solenoid 14 is operated and the carriage 12 is released from engagement with the endless belt 19. When the sub-scanning drive motor 28 is in a stop mode, the torque required to turn the rotary shaft of the sub-scanning motor 28 is return far greater than the torque provided by the tension of the spring 20. Therefore, so long as the carriage 12 is coupled with the endless belt 19, it remains stationary in the position where it is engaged with the belt 19. Hence, the carriage 12 moves toward its initial position by repeating an incremental return operation responsive to pulses supplied from the solenoid 14 until it abutts against the microswitch 24.

When the carriage 12 stops at the initial position, the input F has a high level and the flip-flop 35 is reset to stop the supply of current to the solenoid and to keep the plunger 15 in its position which holds the endless belt in place.

As can be seen from the foregoing description, the arrangement of this invention intermittently supplies the driving current to the solenoid 14, thereby to intermittently engage the carriage 12 with and disengage it from the endless belt 19 to the extent that the inertia force applied to the carriage 12 by the tension of the spring 20 is not great; thus, only a small impact will result when the carriage returns to the initial position. In other words, the solenoid 14 mounted on the carriage 12 functions both to engage the carriage with the belt and to buffer the resulting return impact. This invention has the advantage that it is a simple and practical automatic carriage return device which requires no other special control mechanism.

This invention has been described hereinabove with reference to the embodiment of a facsimile receiver apparatus wherein the sub-scanning carriage has a recording stylus. However, it will be apparent to those skilled in the art that the automatic carriage return device of this invention may be applied to a facsimile transmitter including an optical sensing device for sensing the density of an original picture supported around the rotary drum. Or, the invention could also be applied to a facsimile transceiver.

What we claim is:

1. In a facsimile apparatus comprising rotary drum means for performing a main scanning, carriage means movable away from an initial position for performing sub-scanning along a path parallel to the axis of the drum, running belt means for moving said carriage means in the sub-scanning direction, coupling means for engaging said belt with said carriage thereby moving said carriage responsive to running of said belt, spring means tensioned during movement of said carriage means for returning said carriage means toward the initial position, and means responsive to completion of the movement of the carriage means for automatically and intermittently actuating said coupling means for repeatedly releasing and reengaging said belt during the return of said carriage toward said initial position reponsive to said tensioned spring means, wherein said carriage is intermittently returned without a jarring impact to said initial position by means of the intermittent actuation of said coupling means to said belt.

2. An automatic carriage return device according to claim 1 wherein said coupling means includes a plunger for pressing against one side of said belt, a boss on the other side of said belt positioned to receive the pressure of said plunger to captivate said belt between said plunger and said boss, solenoid means for operating and releasing said plunger, and means for applying pulse current to said solenoid for intermittently operating said solenoid for coupling said carriage with and releasing it from said belt.

3. An automatic carriage return device according to claim 2 wherein said carriage includes a recording stylus.

4. An automatic carriage return device according to claim 2 wherein said carriage includes an optical sensing means for sensing the density of an original picture wrapped around said drum.

5. A reciprocal mechanical motion control system comprising a mechanical part mounted to move back and forth along a predetermined path extending from an initial position to a stop position, power-driven endless belt means mounted parallel to said predetermined path, spring means for urging said mechanical part to move along said path toward said initial position, and means for coupling said mechanical part to said driven belt for moving said part against the urging of said spring means to said stop position and for thereafter intermittently operating said coupling means to enable said spring means to intermittently retract said part along said path to said initial position.

6. The system of claim 5 wherein said predetermined path is parallel to a drum of a facsimile apparatus and said mechanical part carries means for converting incremental images to electrical signals or electrical signals to incremental images.

7. A method of moving two mechanical parts relative to each other, said method comprising the steps of:
 a. rotating a first of said two mechanical parts about an axis;
 b. moving a second of said two mechanical parts under urging of a means for applying a driving force from a power source through an engaging means to said second part, said second part moving from an initial position over a path parallel to said axis and adjacent a surface of said first part to a stop position, while tensioning a return spring in the process;
 c. intermittently releasing and reengaging said engaging means at a predetermined repetition rate during the return of said second part toward said initial position to provide an intermittent association between said second part and said means for applying said driving force; and d. urging said second of said two parts toward said initial position under the tension of said return spring during each of said intermittent releases of said engaging means to disassociate the second part from said means for applying a driving force.

8. The method of claim 7 wherein step c. includes the step of intermittently releasing and reengaging said engaging means responsive to a stream of clock pulses which recur at said repetition rate.

* * * * *

UNITED STATES PATENT AND TRADEMARK OFFICE
CERTIFICATE OF CORRECTION

PATENT NO. : 4,262,311
DATED : April 14, 1981
INVENTOR(S) : HARUNORI TACHIKAWA; SADAYOSHI KIMURA It is certified that error appears in the above—identified patent and that said Letters Patent is hereby corrected as shown below:

Col. 3, line 28, after "is" delete "return";

Col. 3, line 29, after "the" and before "torque", insert --return--.

Signed and Sealed this

First Day of September 1981

[SEAL]

Attest:

Attesting Officer

GERALD J. MOSSINGHOFF
Commissioner of Patents and Trademarks